United States Patent Office 3,253,023
Patented May 24, 1966

3,253,023
RECOVERY OF 3-(3,4-DIHYDROXYPHENYL)-L-ALANINE FROM VELVET BEANS
Don V. Wysong, Midland, Mich., assignor to The Dow Chemical Company, Midland, Mich., a corporation of Delaware
No Drawing. Filed Sept. 27, 1963, Ser. No. 311,944
4 Claims. (Cl. 260—519)

This invention concerns a method for recovering 3-(3,4-dihydroxyphenyl)-L-alanine, hereinafter L-DOPA, from ground velvet beans which contain L-DOPA, advantageously *Stizolobium deeringianum*.

It is known to isolate L-DOPA from finely ground velvet bean meal (*Vicia faba*) by extraction thereof with dilute sulfurous acid. The process also dissolves proteins therein which must be precipitated from the resulting extract by means of aqueous lead acetate. After filtering off precipitated proteins, the filtrate is made slightly alkaline to precipitate the lead salt of L-DOPA. Free L-DOPA is then obtained by decomposing the lead salt thereof with hydrogen sulfide.

In the practice of this invention, ground velvet beans are extracted with an aqueous dilute solution of an organic acid having a pH of 2 to 6. Preferably, water-soluble aliphatic carboxylic acids, e.g., acetic acid in concentrations of about 1 to about 10 percent, and in proportions of 5 to 10 volumes per volume of ground velvet beans are used as extractants. An extraction temperature of ca. 10°–80° C., preferably 20°–60° C., is used, advantageously for time sufficient to dissolve at least a substantial proportion of the L-DOPA content, as determined by analysis. Usually an extraction time of about 10 to 20 hours suffices, with occasional stirring during the first four hours. The extraction liquor is separated from the bean pulp slurry, advantageously by decanting as much of it as possible and vacuum filtering the residual bean pulp slurry, advantageously through a cake of acid-washed diatomaceous earth. The decanted liquor is combined with the filtrate from the bean pulp slurry and concentrated under vacuum and a nitrogen atmosphere, advantageously to ⅕ to ⅒ of its volume to give a solution of about 1 to about 2 percent L-DOPA. After treatment with a sorbant such as acid-washed activated carbon, the concentrate is filtered through a bed of a sorbant, advantageously acid-washed diatomaceous earth. The resulting filtrate is advantageously concentrated to incipient crystallization, approximately one-half its volume. The resulting concentrate is advantageously cooled for several hours at a temperature of about 5° C. to crystallize L-DOPA. There is thereby obtained L-DOPA, M.P. 284°–286° C. (dec.); $[\alpha]_D$ —8.81°, 1 percent solution in 4 percent hydrochloric acid.

A shorter extraction time than 10 hours gives a poorer extraction, while a longer extraction time than 20 hours gives no increase in yield. Higher extraction temperatures than 80° C. dissolve more bean pulp and make the pulp more pasty, thereby rendering filtration extremely difficult and slow. Greater volumes of extractant than about 10 per volume of ground velvet beans require more plant and more work-up time with no improvement in product yield. Lesser volumes of extractant than 5 per volume of ground velvet beans reduce the product yield. The utilization for extraction of dilute acids having a pH lower than 2 dissolves more of the bean pulp, makes filtration and product isolation extremely difficult due to contamination with dissolved bean pulp, while the use for extraction of extractants more basic than pH 6 is detrimental in that oxidation of product is thereby promoted.

The following example describes completely a representative specific embodiment and the best mode contemplated by the inventor of carrying out the inventive process. It is not to be considered as limiting the invention other than as defined in the claims.

*Example*

A charge of 1000 g. of ground velvet beans was extracted with 9 liters of 1 percent aqueous acetic acid at room temperature over a 20-hour period with occasional stirring during the first 4 hours. The liquor was decanted and the bean pulp slurry was vacuum filtered through a cake of acid-washed diatomaceous earth in a Buechner funnel. The decanted liquor was combined with the filtrate and concentrated under vacuum and a nitrogen atmosphere to a volume of 900 ml. After treating with acid-washed activated carbon, the concentrate was then filtered through acid-washed diatomaceous earth. After concentrating the filtrate to approximately 400 ml., solids started crystallizing out, at which time the filtrate was cooled by refrigerating at 5° C. for several hours. Filtration gave 18.7 g. of L-DOPA, M.P. 284°–286° C. (dec.); $[\alpha]_D$ —8.81° (1 percent solution in aqueous 4 percent HCl). The infrared spectrum and paper chromatography indicated very good L-DOPA.

Formic, chloroacetic and propionic acids are substituted in place of acetic acid with comparable results.

What is claimed is:

1. A method for recovering 3-(3,4-dihydroxyphenyl)-L-alanine from comminuted velvet beans which comprises extracting said comminuted beans with a dilute aqueous solution of an acid of the group consisting of formic, acetic, chloroacetic, and propionic acids having a pH between about 2 and about 6 at a temperature of about 10° to about 80° C. for a time sufficient to dissolve a substantial proportion of the 3-(3,4-dihydroxyphenyl)-L-alanine therein, separating extract phase from said comminuted beans and recovering product 3-(3,4-dihydroxyphenyl)-L-alanine therefrom.

2. A method for recovering 3-(3,4-dihydroxyphenyl)-L-alanine from comminuted velvet beans which comprises extracting said comminuted beans with a dilute aqueous solution of an acid of the group consisting of formic, acetic, chloroacetic, and propionic acids having a pH between about 2 and about 6 at a temperature of about 10° to about 80° C. for a time sufficient to dissolve a substantial proportion of the 3-(3,4-dihydroxyphenyl)-L-alanine therein, separating extract phase from said comminuted beans, concentrating said extract phase to a point short of crystallization, purifying said concentrate by treatment with a sorbant, further concentrating said purified concentrate to incipient crystallization, cooling said last concentrate to crystallize 3-(3,4-dihydroxyphenyl)-L-alanine product and recovering said product therefrom.

3. The method of claim 1 wherein the extractant is aqueous 1 percent to 10 percent acetic acid.

4. A method for recovering 3-(3,4-dihydroxyphenyl)-L-alanine from comminuted velvet beans which comprises extracting said comminuted beans with aqueous 1 percent acetic acid in a proportion of about 9 weight parts of said acid per weight part of comminuted velvet beans for a time sufficient to dissolve a substantial proportion of the 3-(3,4-dihydroxyphenyl) - L - alanine therein, separating the extract phase from the comminuted beans, concentrating said extract phase to about 10 percent of its original volume, treating said concentrate with acid-treated active carbon, filtering said treated concentrate through a bed of acid-treated diatomaceous earth, concentrating the resulting filtrate to incipient crystallization, cooling said filtrate to crystallize 3 - (3,4 - dihydroxyphenyl)-L-alanine product and recovering said product from the mother liquor.

References Cited by the Examiner

Miller: J. Biol. Chem. 44, 481–486 (1920).
Rolland et al.: Bull Soc. Chim. Biol. 42, 1065–1077 (1960).

LEON ZITVER, *Primary Examiner.*

DANIEL D. HORWITZ, *Examiner.*